United States Patent
Rodriguez

(10) Patent No.: US 7,743,323 B1
(45) Date of Patent: Jun. 22, 2010

(54) METHOD AND APPARATUS TO CUSTOMIZE LAYOUT AND PRESENTATION

(75) Inventor: John E. Rodriguez, Capitola, CA (US)

(73) Assignee: Verisign, Inc., Mountain View, CA (US)

( * ) Notice: Subject to any disclaimer, the term of this patent is extended or adjusted under 35 U.S.C. 154(b) by 1105 days.

(21) Appl. No.: 11/246,441

(22) Filed: Oct. 6, 2005

(51) Int. Cl.
*G06F 17/00* (2006.01)

(52) U.S. Cl. .................. 715/243; 715/200; 715/201; 715/202; 715/244; 715/246

(58) Field of Classification Search ......... 715/200–202, 715/204, 210, 234, 243
See application file for complete search history.

(56) References Cited

U.S. PATENT DOCUMENTS

| 7,266,568 | B1 * | 9/2007 | Erol et al. ................. 715/205 |
| 2002/0099842 | A1 * | 7/2002 | Jennings et al. ............. 709/231 |
| 2005/0091574 | A1 * | 4/2005 | Maaniitty et al. ........ 715/500.1 |
| 2006/0052118 | A1 * | 3/2006 | Furon et al. ................. 455/466 |
| 2006/0168517 | A1 * | 7/2006 | Itoh et al. ................... 715/517 |
| 2006/0256130 | A1 * | 11/2006 | Gonzalez .................... 345/619 |
| 2007/0100942 | A1 * | 5/2007 | Lin et al. .................... 709/206 |
| 2009/0017795 | A1 * | 1/2009 | Guichard et al. ......... 455/414.1 |
| 2009/0029723 | A1 * | 1/2009 | Doyle et al. ................ 455/466 |

\* cited by examiner

*Primary Examiner*—Laurie Ries
*Assistant Examiner*—Chau Nguyen
(74) *Attorney, Agent, or Firm*—Blakely, Sokoloff, Taylor & Zafman, LLP; Judith A. Szepesi

(57) ABSTRACT

A method and apparatus for generating customized layout and presentation data.

16 Claims, 3 Drawing Sheets

METHOD AND APPARATUS TO CUSTOMIZE LAYOUT AND PRESENTATION

FIELD OF THE INVENTION

The present invention relates to layout and presentation, and more particularly to customizing layout and presentation.

BACKGROUND

SMIL is a layout and presentation language used on mobile phones that allows display of media. A set of media items can be played together. This is similar to a slide on a presentation or a slideshow. Each "par" SMIL tag specifies that the media are grouped and displayed or played in parallel. There are certain constraints or rules, because of receiving device limitations, that specify which types of media items can be placed on the same "slide." Media Content type tags may for example include (a) text, (b) image, (c) audio, and (d) video.

The following is an example of a SMIL presentation layout under the "head" tag. The media is given under the "body" tags along with how long to display them e.g. dur="5s" means to display for 5 seconds. This example has 2 "par" tags which can be thought of as 2 slides that are played in order. The first slide has text, an image, and an audio data. The second slide has only 1 image.

```
<smil>
    <head>
        <layout>
            <root-layout width="40" height="40"/>
            <region id="REGION_1" left="0%"
                top="0%" height="67%" width="100%" fit="meet"/>
            <region id="REGION_2" left="0%"
                top="67%" height="33%" width="100%" fit="meet"/>
        </layout>
    </head>
    <body>
        <par dur="5s">
            <text src="smiltextpartfilename0.txt" type="text/plain"
                region="REGION_2"/>
            <img src="08-25-04_1443.jpg" type="image/jpeg"
                region="REGION_1"/>
            <audio src="smil_vn_1093446932.amr"/>
        </par>
        <par dur="5s">
            <img src="08-24-04_1213.jpg" type="image/jpeg"
                region="REGION_1"/>
        </par>
    </body>
</smil>
```

In general, the SMIL presentation layout is generated by the handset sending the data, or by a content provider.

SUMMARY OF THE INVENTION

A method and apparatus for generating customized layout and presentation data.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The method and apparatus describe a way of generating customized layout and presentation data. In one embodiment, the layout and presentation data is generated in SMIL (Synchronized Media Integration Language). Alternative languages are, however, within the scope of this disclosure. In one embodiment, the layout language generation is done during the MM1_retrieve.REQ when the recipient handset sends the MMSC its MMS User Agent capabilities. This is basically a profile of the handset. The profile data, in one embodiment, is used to generate the customized layout, based on the device capabilities. Alternatively, the customization may be done based on network type, MMSC capabilities, provider preferences, subscription type, or other variables.

There are 3 ways that handsets display media

1. MMS messages which generally use SMIL
2. WAP (wireless access protocol) browsing using XHTML and CSS. This is usually for something more complicated like a handset browsing a web site and displaying the content on the screen. The display can be customized per handset because some handsets do not support all XHTML or CSS features. essentially the same problem that "a" above solves.
3. WAP (wireless access protocol) browsing using XHTML and WML for layout The scheduler of the present invention may be used to create SMIL layouts, or to dynamically control how XHTML or WML is generated. Both of these types of scheduling may be set up on a per-handset capability basis, on a per MMSC basis, or on another basis.

Generally, in WAP browsing, the content to display is an XHTML file listing the media, and the presentation rules are provided in CSS. The scheduler of the present invention may be used to customize the XHTML. In one embodiment, a single CSS format is used, where the CSS format is a union of all of the features that work in all of the handsets. The XHTML would describe elements such as video, image, text, and audio, is similar to the description by the SMIL layout language.

For simplicity, in the description below, the SMIL layout language customization is described. However, one of skill in the art would understand how to utilize the scheduler described herein to customize XHTML, WML or other layout.

The scheduling mechanism described herein may be used at various levels, for the generation of display, in various formats or layout languages. For example, the scheduler may be used at the MMSC level. In one embodiment, a central exchange relay—which can be used to interconnect between MMSCs—may utilize the scheduling mechanism. In one embodiment, a multimedia message composer, such as the PictureMail Composer of LightSurf Technologies may use the scheduler to construct and schedule SMIL dynamically. In one embodiment, a Content Download server may use the scheduler described herein to construct and schedule dynamically. Alternative locations for the scheduler may be found.

Figure 1:
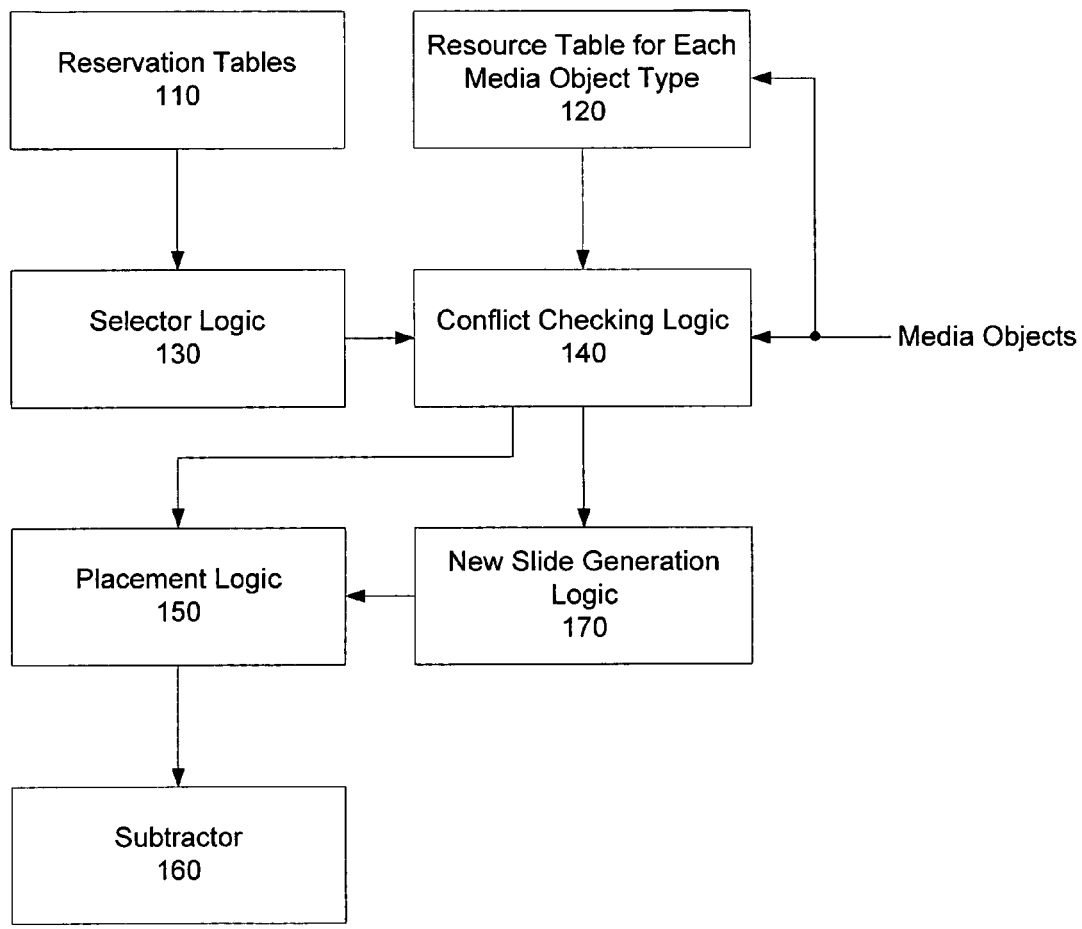
FIG. 1 is a block diagram of one embodiment of the customized layout generator in accordance with the present invention.

FIG. 1 is a block diagram of one embodiment of the customized layout generator in accordance with the present invention. The system includes one or more reservation tables 110. Reservation tables indicate the number of available resource slots on a single slide, as generated by the layout generator. In one embodiment, the reservation table indicates that there is one each: video, image, audio, and text slots. Reservation tables 110 may be a default, or may vary by handset, MMSC, subscription type, or other. Selector logic 130 selects the appropriate reservation table 110. In one embodiment, there is only one reservation table available. In another embodiment, the selector logic 130 selects based on the handset type. In another embodiment, the selector logic 130 selects based on the capabilities of the MMSC. In another embodiment, the selector logic 130 selects based on the network type (for example CDMA, GSM).

There is a resource table associated with each media type, the resource table identifying resources occupied by the media type. For example, a video may occupy a video, image, and audio slot. The resource tables are, in one embodiment, unchanging. However, in one embodiment, new resource types may be added, as they become available. For example, a "motion JPEG" image may be classified as a new type of image (moving image) and may occupy the video and image slots.

New media objects are received by layout and placement logic. Generally messages are received from phones in MIME format. MM1, in one embodiment, is WAP binary encoded, and MM4 is the SMTP MIME format. The original MIME message format may be flat (no hierarchy) or it may be hierarchical. The system takes a MIME message, and discovers the order of the media objects. For hierarchical MIME messages, a preprocessor (not shown) uses a "depth first search order" to discovery the ordering of the media objects, in one embodiment. Depth-first search (DFS) is a known algorithm for traversing or searching a tree, tree structure, or graph. DFS starts at the root (selecting some node as the root in the graph case) and explores as far as possible along each branch before backtracking. In one embodiment, this system may be used in an MMSC (multimedia message service center), for generating a SMIL, or other, layout for a multimedia message. As noted above, the scheduler may alternatively—or additionally—be used by a central exchange relay, a multimedia message composer, or a content download manager.

When the media objects are received, the appropriate resource table, for each media object, is selected.

Conflict checking logic 140 determines, for each media item, whether a current slide has sufficient space for the media item. If so, placement logic 150 adds the media item to the slide, and subtractor 160 removes the appropriate slots from the list of available slots.

If conflict checking logic 140 determines that the media item does not fit, new slide generation logic 170 generates a new slide. New slide generation logic 170 also resets the reservation table for the new slide. The placement logic 150 then places the media item on the new slide.

Figure 2:
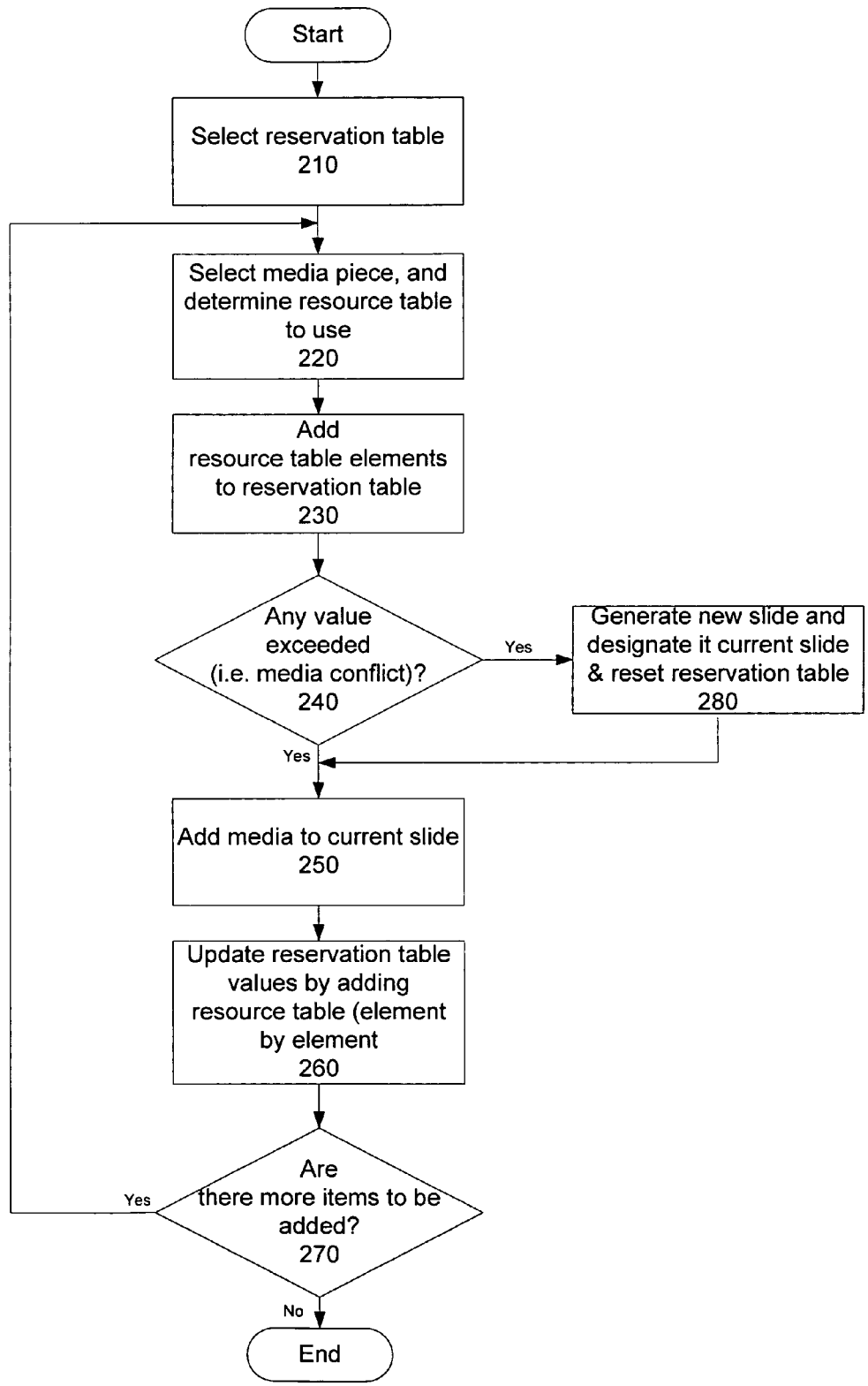
FIG. 2 is a flowchart of one embodiment of customizing the layout and presentation data.

FIG. 2 is a flowchart of one embodiment of customizing the layout and presentation data. In one embodiment, implementing this scheduler takes about 5 lines of code (not counting the static tables). Thus, it is extremely simple and efficient. There are two portions to this calculation. One is the item which is being placed into the code, i.e. the video, image, audio, or text that is going to be sent to a user. The second is the "reservation table" which is associated with a default setting, the MMSC, the user's handset, or other configurations. The reservation table indicates the total number of slots of each type available for this particular message.

A reservation table is an array (or an array of arrays) where each slot represents a resource. In the example below, there are four possible resources, and an empty table. The resources may have an index of their matrix represented as a "1" when it uses the resource and a "0" when it does not. It is potentially possible for an item to use two resources, for example a three dimensional display may potentially use two image channels. The present system is adaptable, and could accommodate such items.

In the exemplary resource arrays below, note that the VIDEO_RESOURCE has more than 1 index with a "1". This means that a video item will conflict with other resources and use their slots.

Static Declarations

|  | V | I | A | T |
|---|---|---|---|---|
| private static final int[ ] VIDEO_RESOURCE = | { 1, | 1, | 1, | 0 }; |
| private static final int[ ] IMAGE_RESOURCE = | { 0, | 1, | 0, | 0 }; |
| private static final int[ ] AUDIO_RESOURCE = | { 0, | 0, | 1, | 0 }; |
| private static final int[ ] TEXT_RESOURCE = | { 0, | 0, | 0, | 1 }; |
| private static final int[ ] EMPTY_TABLE = | { 0, | 0, | 0, | 0 }; |

During placement, the process determines, for each item, whether the associated slots in the reservation table are free. If the slots are not free, then the item must go to the next slide. The elements of resource indices represented by the VIDEO_RESOURCE means that a slide with a video uses not only the video slot but also the Image (I) and the Audio (A) slot.

The "1"s of the VIDEO_RESOURCE indicates that if there is a video on the slide then the only other media resource available is the "T" or text resource, in this example. So we can have a slide with 1 video and 1 text but something like 1 video and 1 image is not allowed.

The reservation table below is used to determine allowable media configurations in each <par> element of a SMIL. The rows of the reservation table represent the resources needed by each media type. The columns of the reservation table represent the resources available in a <par> element.

|  | Video | Image | Audio | Text |
|---|---|---|---|---|
| Video | 1 | 1 | 1 | 0 |
| Image | 0 | 1 | 0 | 0 |
| Audio | 0 | 0 | 1 | 0 |
| Text | 0 | 0 | 0 | 1 |

Analysis:
1) The 'Video' media type requires the Video, Image, and Audio resources of a <par> element (slide)
2) The 'Image' media type requires the Image resource of a <par> element
3) The 'Audio' media type requires the Audio resource of a <par> element
4) The 'Text' media type requires the Text resource of a <par> element The 'Video' element appears first because it is the media type that causes the most conflicts.

In one embodiment, 4-element integer arrays are used to define rows of the above reservation table: VIDEO_RESOURCE, IMAGE_RESOURCE, AUDIO_RESOURCE, TEXT_RESOURCE. A single 4-element integer array, SLIDE_RESERVATION_TABLE, is used to represent the columns.

In an alternative embodiment, bit vectors could be used, instead of integer arrays. However, by using integer arrays, we can set the number of resources to allow more then 1 resource. For example if we wanted to allow 2 Images per slide:

|  | V | I | A | T |
|---|---|---|---|---|
| IMAGE_RESOURCE = { | 0, | 1, | 0, | 0 } | then just adjust the reservation table for each different handset or MMSC profile.

int[ ] reservationTable={0, −1, 0, 0};

Algorithm:
0. Select reservation table, based on handset, MMSC, default. (block 210)
1. For each media piece (block 270)
2. determine which resource table to use by media type (block 220)
3. add each element of resource table to each element of reservation table (block 230)
4. if the result of any addition >1 (media conflict) (block 240)
5. create a new slide and reset reservation table (block 280)
6. set new slide as current slide (280)
7. add media to current slide (block 250)
8. update reservation table by adding resource table, element-by-element (block 260)
9. determine if there are any more items to add, and if so, return to block 220 (block 270)

An exemplary implementation is shown below:

```
int[ ] resourceTable = { 0, 0, 0, 0 };
// determine which resource table to use
if( mediaType.equalsIgnoreCase("video") ){
    resourceTable = VIDEO_RESOURCE;
}else if(mediaType.equalsIgnoreCase("image") ){
    resourceTable = IMAGE_RESOURCE;
}else if(mediaType.equalsIgnoreCase("audio") ){
    resourceTable = AUDIO_RESOURCE;
}else if(mediaType.equalsIgnoreCase("text") ){
    resourceTable = TEXT_RESOURCE;
}else{
    logger.severe("UNKNOWN MEDIA TYPE IN SMIL
    BUILDER: " + mediaType);
}
```

This first loop is the test. Nothing is placed in the reservation table until it is ensured that the media resource will not have any conflicts. So each index is tested against the current values in the reservation table. In one embodiment, an add function is used. In an alternative embodiment, an "and" function with bit vectors may be used.

In one embodiment, the reservation table is implemented as a multi-dimensional array. This would be used, for example when one wants to do something like backtracking or bottom up scheduling. In the case of the media scheduler, it is adequate to just use a 1 row reservation table and assign the EMPTY_TABLE to it whenever a new slide is started.

Check for Conflicts:

```
//                          V    I    A    T
int[ ] reservationTable =   { 0, 0, 0, 0 };
boolean mediaConflict = false;
for(int j = 0;
(mediaConflict == false) && (j < resourceTable.length); j++){
    if(resourceTable[j] + reservationTable[j] > 1){
        mediaConflict = true;
        break; // bail because any conflict means a new slide is needed
    }
}
```

If the break is not reached, i.e. the conflict check determines that there is no conflict, then the process puts the media resource into the table. Else if there was a conflict, a new slide is added to the table. Add to the Reservation table:

```
for(int j = 0; j < resourceTable.length; j++){
    reservationTable[j] = reservationTable[j] + resourceTable[j];
}
```

The algorithm is easily extensible.

If the SMIL specification or phone capabilities change, e.g. a phone is able to display 3 images instead of 1 then the algorithm would not change but the array holding the IMAGE_RESOURCE would change from:

| reservationTable = | { | 0, | 0, | 0, | 0 } |
|---|---|---|---|---|---|
| to |  |  |  |  |  |
| reservationTable = | { | 0, | −2, | 0, | 0 } |

This requires no change at all to the scheduling logic itself. This means that as the phone capabilities change, the system is easily adjusted.

The above described scheduler may also be used to provide dynamic rewriting of SMIL based on handset profile. In one embodiment, the scheduler will be used to adjust the SMIL in the message sent according to the capabilities of the handset or the associated MMSC.

For example, if we had 3 MMSC's forwarding:

handset <--> CDMA MSMC <--> central server <--> GSM MMSC <--> handset

Figure 3:
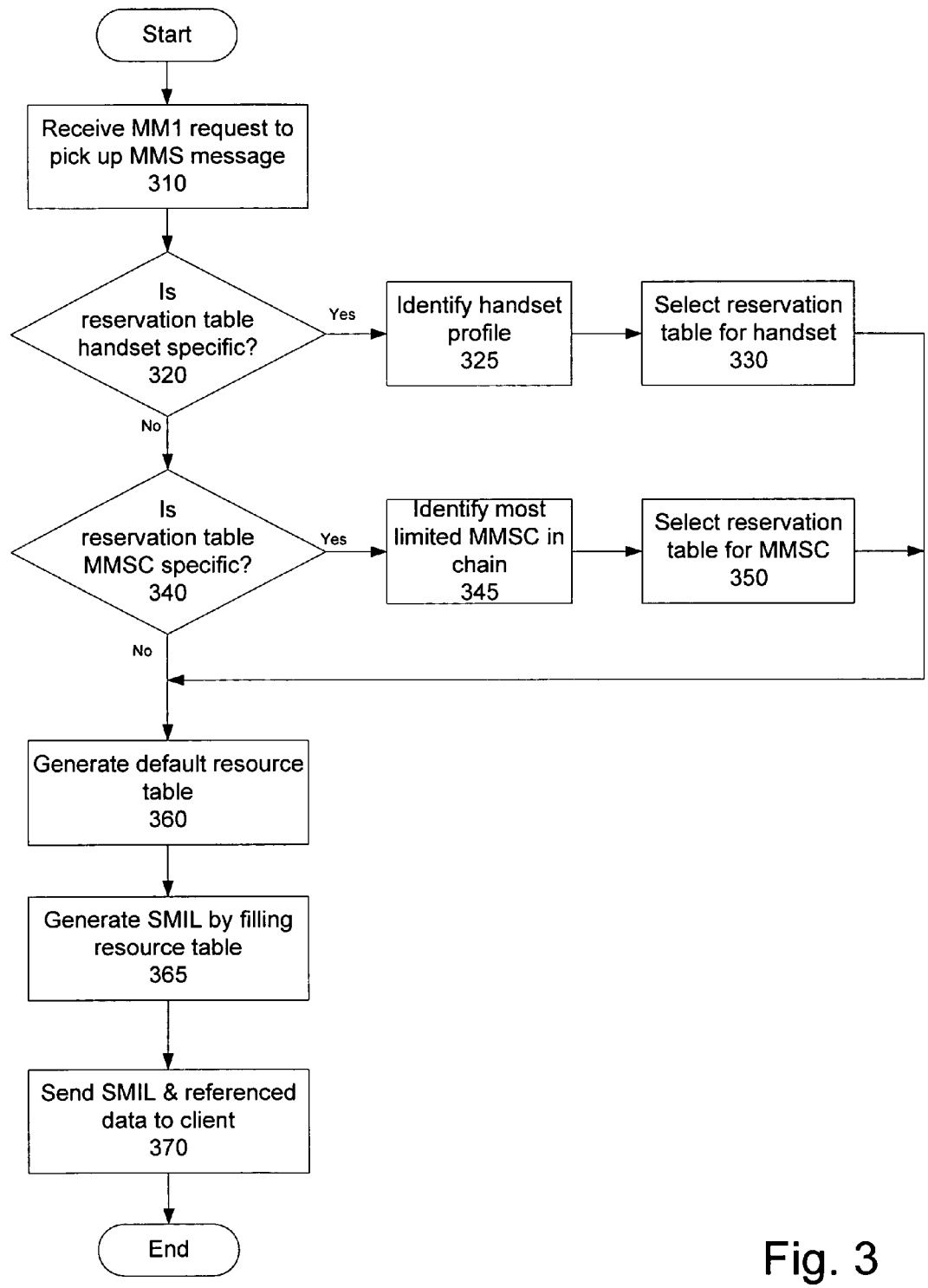
FIG. 3 is a flowchart of one embodiment of selecting a reservation table, in accordance with the present invention.

In one embodiment, the scheduler can be used to adjust the message according to the handsets capabilities or limitations, based on the receiving MMSC's capabilities. Different ordering of resource constraints can be fed to the same scheduler with no change in the logic. FIG. 3 illustrates a flowchart of one embodiment of such an adjustment. In one embodiment, the reservation table may be selected based on the MMSC's capabilities, or the handset's capabilities. In one embodiment, other adjustment bases, such as subscription type, bandwidth, etc. may be utilized.

Some handsets do not write SMIL and others require it, therefore the system may be set up to build the SMIL dynamically according to whatever is required. It is a way to layout the slides of the message in an ordered way with very little code but still respect SMIL or handset/MMSC constraints. The current SMIL specification—which handsets are required to adhere to—says that there should only be 1 image per slide. This constraint is only there because the displays of the current handsets are so small. However, the displays are quickly getting larger. For example, the current Treo handset is a combination PDA/phone and therefore the display is larger. As display sizes increase, and some handsets are capable of displaying 2 images per slide, the dynamic building of SMIL will become even more useful.

In one embodiment, the scheduling is run on a Mime/Multipart structure. It could be flat or a multi-hierarchical Mime structure such as a Mime/Multipart that contains a Multipart/Related content-type.

MultipartMixed (MM)
Audio1
Text1
Image2
Text2
Image3
Text3
EndMultipartMixed

If the SMIL scheduler is run on this Mime structure, it would have the following slides, where slides are demarcated by "---" lines.

```
Multipart Mixed (MM)
---------- Slide 1
Audio1 - { 0, 0, 1, 0 }
Text1 - { 0, 0, 1, 1 }
Image2 - { 0, 1, 1, 1 } next Text2 causes a conflict and starts Slide 2
---------- Slide 2
Text2 - { 0, 0, 0, 1 }
Image3 - { 0, 1, 0, 1 } next Text3 causes a conflict and starts Slide 3
---------- Slide 3
Text3 - { 0, 0, 0, 1 }
EndMultipartMixed
```

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A system for customizing layout generation logic to provide data to a target device, the system comprising:
   a memory including a plurality of resource tables, each of the plurality of resource tables associated with a corresponding media type, each of the plurality of resource tables identifying resources occupied by the corresponding media type;
   a processor including
      a selector logic to select a reservation table from one or more reservation tables, the one or more reservation tables indicating a number of available resource slots on a slide, the selector logic further to select and an appropriate resource table from the plurality of resource tables, the appropriate resource table selected based on a selected media item;
      a conflict checking logic to determine whether a current slide has sufficient space for the selected media item;
      a placement logic to place the selected media item in the current slide when the current slide has sufficient space for the selected media item; and
      a new slide generation logic to generate a new slide, and to designate the new slide as the current slide when the current slide does not have sufficient space for the selected media item, and the placement logic to place the selected media item in the current slide.

2. The system of claim 1, wherein the reservation table is selected based on a default setting.

3. The system of claim 1, wherein the reservation table is selected based on a capability of a multimedia messaging system used to send the slides.

4. The system of claim 1, wherein the reservation table is selected based on capabilities of a handset to which the resulting data is to be sent.

5. The system of claim 1, wherein the layout generation logic generates a SMIL layout.

6. The system of claim 1, further comprising:
   a subtractor to adjust values in the reservation table based on the newly added media item.

7. The system of claim 1, wherein the layout generation logic implemented on the system is implemented in one of the following locations: a multimedia messaging service center, a central exchange relay, a multimedia message composer, a content generation server, or a content download server.

8. A method of generating a customized layout comprising:
   selecting a reservation table from one or more reservation tables at a server, each reservation table being stored in a memory as an array, each reservation table indicating a number of available resource slots on a slide;
   selecting an appropriate resource table from a plurality of resource tables, each of the plurality of resource tables associated with a media type, each of the plurality of resource tables identifying resources occupied by a corresponding media type, the appropriate resource table selected based on a media item;
   for each media item, verifying that a current slide has sufficient space for the selected media item represented by the reservation table by comparing the resource needs of the media item with the reservation table array; and
   when the current slide has sufficient space for the selected media item, adding the media item to the current slide;
   when the current slide does not have sufficient space for the selected media item, creating a new slide with an associated new reservation table, designating the new slide as the current slide and placing the media item on the new slide; and
   reducing a number of available slots on the reservation table by the number of slots occupied by the media item.

9. The method of claim 8, wherein the reservation table is selected based on one or more of a default setting, a capability of a multimedia messaging system used to send the slides, capabilities of a handset to which the resulting data is to be sent, and user preference.

10. The method of claim 8, wherein the layout generation logic generates a SMIL layout.

11. The method of claim 8, wherein the array stored in memory is one or more of an integer array and a multidimensional array.

12. A computer-implemented scheduler to customize a display presentation on a target device, the scheduler comprising:
   a first memory including a plurality of resource tables, each of the plurality of resource tables associated with a media type, each of the plurality of resource tables identifying resources occupied by a corresponding media type;
   a second memory including one or more reservation tables, the one or more reservation tables indicating a number of available resource slots on a slide;
   a server including
      a selector logic to select a reservation table from the one or more reservation tables and an appropriate resource table from the plurality of resource tables, the appropriate resource table selected based on a selected media item; and
      a placement logic to place the selected media item on a current slide represented by a reservation table, when the current slide has sufficient space for the selected media item by determining whether there is a free slot in the reservation table for each resource in the appropriate resource table; and
      a new slide generation logic to generate a new slide when the current slide does not have sufficient space for the selected media item.

13. The scheduler of claim 12, wherein the reservation table is selected based on one or more of the following: a default setting, a multimedia messaging service center capability, a handset capability, a user preference.

14. The scheduler of claim 12, wherein the scheduler is implemented in one of the following locations: a multimedia messaging service center, a central exchange relay, a multimedia message composer, a content generation server, or a content download server.

15. The scheduler of claim 12, further comprising:
a subtractor to adjust values in the reservation table based on the newly added media item.

16. The scheduler of claim 12, wherein the layout generation logic generates a SMIL layout.

* * * * *